June 12, 1962  A. S. ZAKRZEWSKI ETAL  3,038,637
FEEDING APPARATUS FOR FASTENERS AND THE LIKE
Filed Sept. 23, 1958  3 Sheets-Sheet 1

INVENTORS:
ANDREW S. ZAKRZEWSKI &
GEORGE S. ASHBY
BY: Beau, Brooks, Buckley & Beau,
ATTORNEYS.

June 12, 1962 A. S. ZAKRZEWSKI ETAL 3,038,637
FEEDING APPARATUS FOR FASTENERS AND THE LIKE
Filed Sept. 23, 1958 3 Sheets-Sheet 2
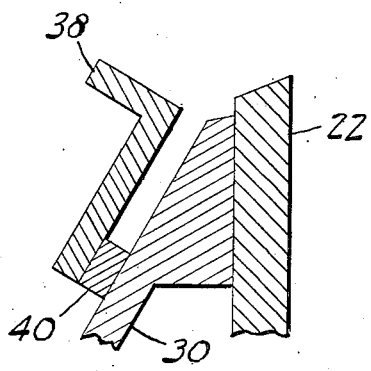
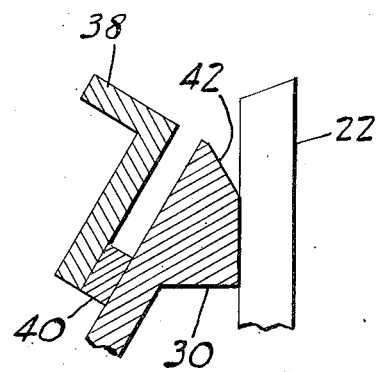
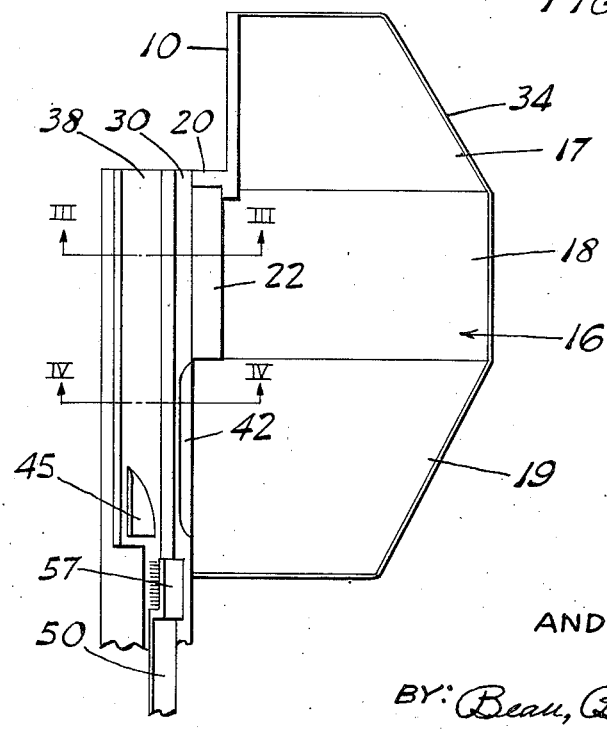
INVENTORS:
ANDREW S. ZAKRZEWSKI &
GEORGE S. ASHBY
BY: Beau, Brooks, Buckley & Beau,
ATTORNEYS.

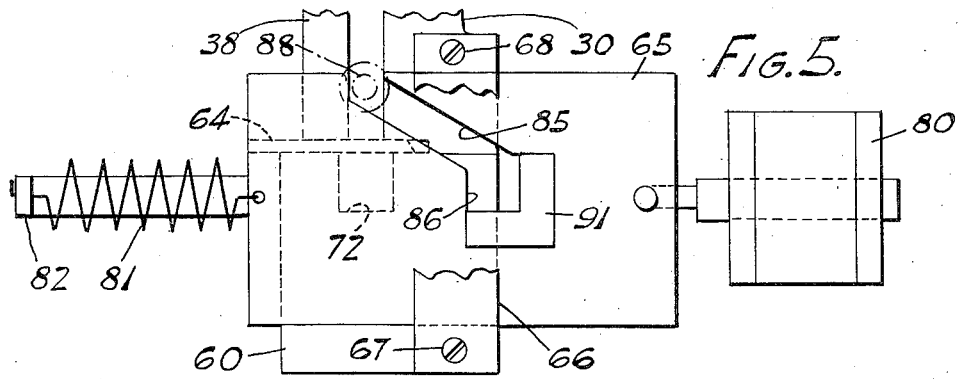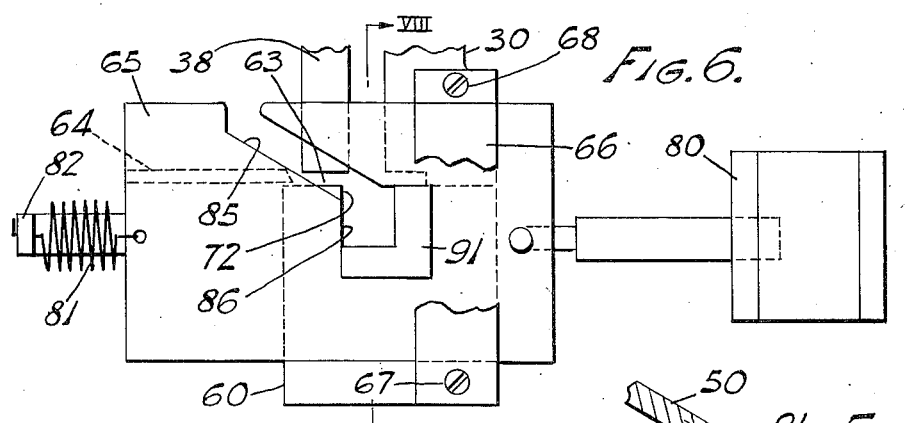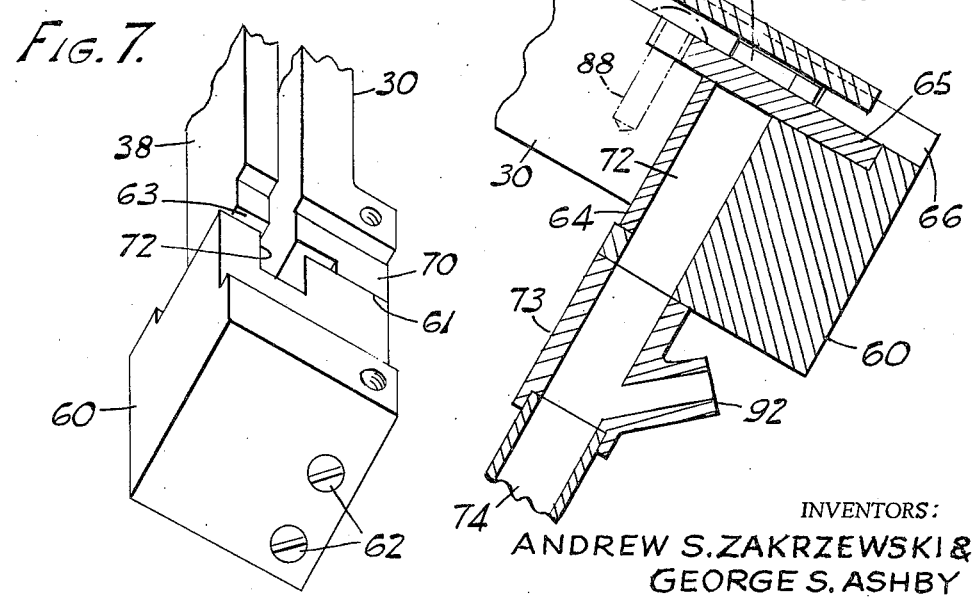

United States Patent Office 3,038,637
Patented June 12, 1962

3,038,637
FEEDING APPARATUS FOR FASTENERS AND THE LIKE
Andrew S. Zakrzewski, Toronto, Ontario, and George S. Ashby, Port Credit, Ontario, Canada, assignors to Pneuma-Serve Limited, Toronto, Ontario, Canada
Filed Sept. 23, 1958, Ser. No. 762,862
2 Claims. (Cl. 221—271)

This invention relates to apparatus for receiving a supply of fasteners or like articles and for orienting the same and dispensing them individually for transferring them to mechanism employing the same. The fasteners dealt with may comprise screws, bolts, rivets, nails, nuts or similar articles.

It is known in the present art to supply a portable electrical or pneumatically operated screw driver, nut runner, rivet gun or like mechanism from a relatively stationary feeder by passing the fasteners to the portable device through a flexible tube or hose under air pressure. The present invention relates to apparatus of this general class and more particularly to the so-called feeder. The apparatus of the present invention may be employed to orient and deliver fasteners or similar articles to a wide variety of devices employing such articles, whether the article employing devices are portable or are likewise stationary.

Apparatus of the type contemplated herein comprises, essentially, a hopper or receptacle for receiving and holding a supply of variously disposed fasteners, means for more or less continuously moving fasteners from the hopper to a trackway and for orienting the fasteners in the trackway, and means for dispensing fasteners from the trackway individually in response to a manual or automatic impulse from the device to which the fasteners are delivered from the dispensing means.

The present apparatus effects a number of improvements in apparatus of this general type and differs from similar apparatus of the prior art particularly in the manner in which fasteners or similar articles are oriented in the above-mentioned trackway, in the construction and mode of operation of the trackway itself, and in the manner in which fasteners are dispensed from the delivery end of the trackway for transmittal to the fastener-employing device. Furthermore, in the arrangement of the present invention means are provided which are readily varied and adjusted to handle and dispense fasteners of different sizes, shapes and other characteristics. The basic apparatus is substantially universal, so that by adjustment thereof and by minor substitution of parts most of the feeding problems normally encountered may be dealt with.

The trackway of the apparatus of the present invention is disposed along an upper side edge of the hopper and, in addition to the usual descending inclination of the trackway for gravity feeding purposes, is inclined transversely toward the hopper. That is, the trackway is so disposed that screws, for instance, have their axes inclined with their head portions closer to the hopper, and the upper surfaces of the trackway are similarly inclined toward the hopper. In this way fasteners are more readily oriented in the hopper, unoriented fasteners are more readily returned to the hopper, and fasteners pass in more strict and accurate alignment along the trackway and into the dispensing mechanism, despite the necessary clearance in the trackway and the fastener receiving parts of the dispensing mechanism.

The foregoing transverse inclination of the trackway very much reduces the possibility of jamming. The inclined position of the outer rail renders it unnecessary to provide the usual additional upright retaining rail or surface which further reduces the likelihood of jamming. The probability of jamming, which is a prime problem in these orienting devices, is still further reduced by the readiness with which unoriented fasteners return to the hopper from the transversely inclined trackway and the latter also results in a higher percentage of oriented fasteners out of the number lifted to the trackway by the vertically reciprocating blade. In the arrangement of the present invention the descending trackway passes along the side edge of the hopper a substantial distance beyond the reciprocating blade and unoriented fasteners fall readily back to the hopper from this portion of the trackway.

As to the trackway itself, the simple substitution of spacer bars adapts the same to the handling of screws, for instance, of various diameters, and other simple substitution of parts adapts the trackway for more radical variations in the kind of articles to be handled. As to the ultimate dispensing mechanism, referred to generally later herein as an escapement mechanism, simple replacement of a single plate member adapts the same for different conventional types of fasteners and fasteners of different diameters, while the entire escapement mechanism may readily be removed and replaced when the apparatus is to handle articles which vary more radically from conventional or usual types.

The escapement mechanism itself is of unique design and operation so that it dispenses the articles in a simple yet highly positive and controlled manner which results in a much faster and more certain dispensing operation than similar mechanisms of the prior art. Dispensing operations of this mechanism may be initiated by a manual impulse from the portable driving tool to which the fasteners are delivered, an automatic impulse therefrom, or in any other desired manner.

Various other objects and advantages of the general construction and the fastener feeding principles disclosed herein will occur to those skilled in the present art from a study of the typical embodiment of the present invention which is illustrated in the accompanying drawings and described in detail in the following specification. However, it is to be understood that such embodiment is by way of example only and that numerous modifications may be made therein without departing from the teachings of the invention, the scope of which is limited only as defined in the appended claims.

In the drawings:

FIG. 2 is a general top plan view of the apparatus of FIG. 1;

FIG. 3 is a cross sectional view of the trackway of the apparatus of FIG. 1 taken approximately on the line III—III of FIG. 2;

FIG. 4 is a cross sectional view of the trackway of the apparatus of FIG. 1 taken approximately on the line IV—IV of FIG. 2;

FIG. 5 is a top plan view looking perpendicularly down at the upper surface of the dispensing or escapement mechanism at the lower end of the trackway;

FIG. 6 is a view similar to FIG. 5 but showing the parts of the escapement mechanism in their opposite position of operation; and FIG. 7 is a fragmentary front elevational view of the lower ends of the trackway members; and FIG. 8 is a cross sectional view taken generally on the line VIII—VIII of FIG. 6.

Figure 1:
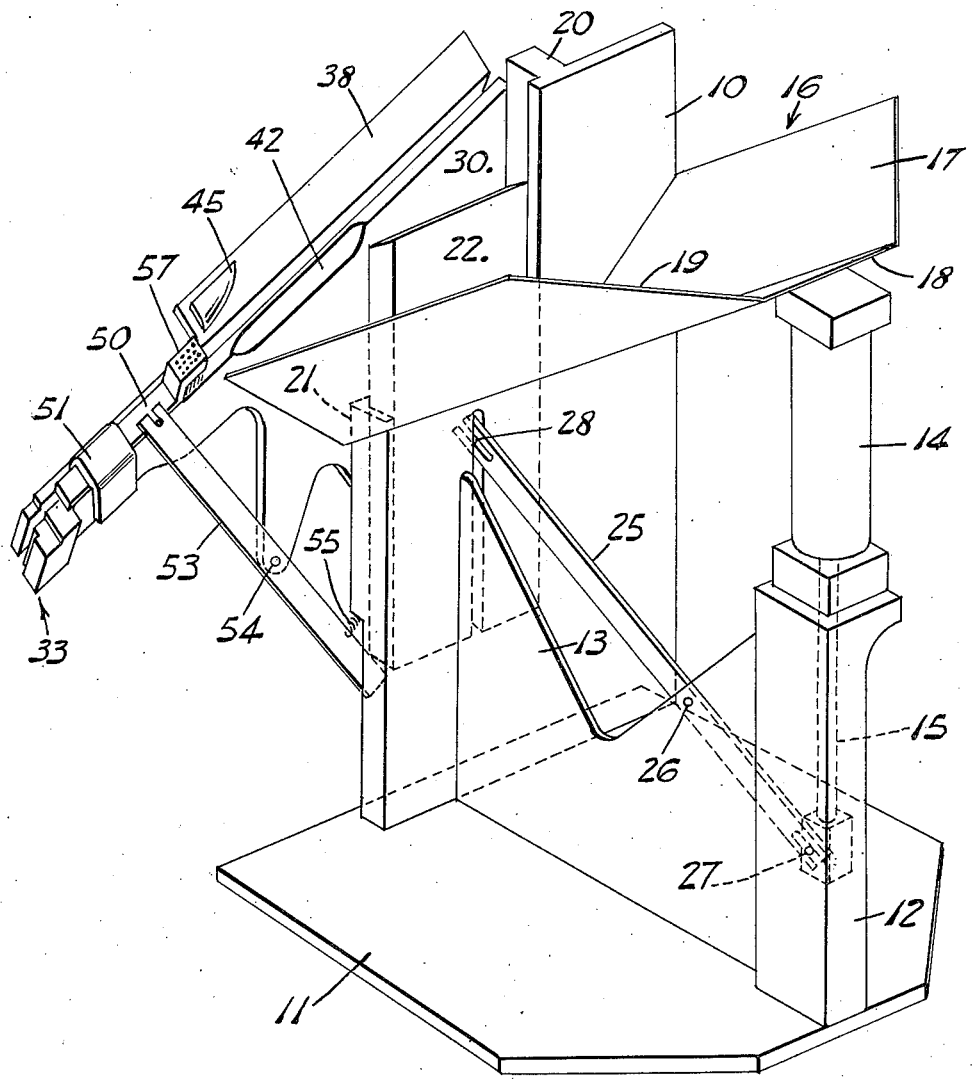
FIG. 1 is a general perspective view of one form of the apparatus of the present invention with certain casing portions removed for added illustration.

Like characters of reference denote like parts throughout the several figures of the drawing and, referring particularly to FIG. 1, a vertical wall member 10 is rigidly secured adjacent to one edge of a base plate 11. A post 12 is fixed to the base plate 11 at its opposite edge and an intervening gusset plate 13 rigidifies the foregoing frame structure. A solenoid 14 is mounted upon post 12 and its reciprocating armature operates a depending rod 15.

A hopper for receiving fasteners is formed by a plate designated generally by the numeral 16 which is composed of three angularly disposed panels 17, 18 and 19 which are inclined downwardly toward wall member 10 and terminate generally in the plane of said wall member and partially in abutment therewith to form a hopper wherein the fasteners will gravitate toward the area or zone where the panel 18 intersects the general plane of wall 10.

Wall 10 is provided with spaced vertical guiding rail formations 20 and 21 and a vertical reciprocable blade member 22 is guided therebetween. Wall 10 is cut away along the line where panel 18 of hopper plate 16 abuts the wall 10. That is, wall 10 is cut away upwardly of such line of abutment so that fasteners gravitate directly against the interior surface of blade 22.

Reciprocation of blade 22 is by means of a lever 25 which is fulcrumed against gusset plate 13 as at 26 and is operatively connected at its opposite ends to solenoid rod 15 and blade 22 by pin and slot connections as shown in FIG. 1 at 27 and 28, respectively.

A bracket 30 is secured to the outer faces of the guide rails 20 and 21 and its inner surface abuts the exterior surface of blade 22 for sliding engagement therewith as blade 22 reciprocates vertically. Panel 19 of the hopper extends to the interior surface of bracket 30 to complete the hopper structure, as shown in FIG. 2.

The upper edge of bracket 30 is generally inclined downwardly to the left as shown in FIG. 1 and comprises one of a pair of guide rail components which form a trackway for guiding a row of fasteners or like elements downwardly to a dispensing mechanism, a portion of the later being indicated generally in FIG. 1 by the numeral 33. As indicated in FIG. 2 a sheet metal enclosure 34 comprising a series of five vertical wall portions attaches to the edges of base plate 11 and the corresponding edges of hopper plate 16. The enclosure 34 is omitted in FIG. 1 for clearer illustration.

The upper edge of bracket 30 and an angle member 38 which is mounted generally thereagainst form the aforementioned trackway for receiving and directing fasteners downwardly to the dispensing mechanism partially shown at 33 in FIG. 1. The conformation of such track is best shown in FIGS. 3 and 4, the former being a cross section taken at the beginning or upper end portion of the track adjacent to the blade member 22 and the latter a cross section taken at a point farther therealong at a point beyond the blade member 22, in the region of the panel 19 of hopper 16.

Angle member 38 is removably attached to bracket 30 by screws or the like with an intermediate filler piece or spacer 40 at the lower portion of angle member 38 which is readily interchangeable to vary the space between the two track forming portions of the members 30 and 38 to accommodate fasteners of different diameters or, in the case of nuts for instance, of different thicknesses. Furthermore, the upper portion of bracket 30 is so formed, as clearly shown in FIGS. 3 and 4, that it disposes the fasteners at a substantial angle to the vertical, viewed as shown in FIGS. 3 and 4. Trackways of this type in the prior art have generally aimed at positioning the fasteners vertically as viewed in transverse cross-section of the track, but it has been found that numerous advantages in ease of orientation and rejection of unoriented fasteners are attained with the oblique fastener channel shown in FIGS. 3 and 4, both as to the trackway itself and as to the dispensing mechanism.

FIG. 3 shows the cross-section of the track-forming members at the area adjacent to the vertical reciprocable blade member 22 and at such point the upper track surface of bracket 30, considered transversely, is nearly horizontal. This disposition of the upper surface of bracket 30 avoids the possibility of occasional jamming of fasteners between the inner rail of the trackway which is formed by bracket 30 and the reciprocable slide 22. The track surface of the angle member 38 is rather wide and inclined downwardly toward the space between the members 30 and 38 so that no further fastener retaining wall is required to the outside of the trackway and fasteners deposited thereon by the reciprocating blade 22 automatically move toward the hopper so that in general they either orient themselves in the trackway or fall back to the hopper as the blade 22 lowers.

At a point further down along the inclined trackway, just beyond the blade 22, the upper track forming surface of bracket 30 is steeply inclined toward the hopper as indicated at 42 in FIG. 4, which facilitates the return of unoriented fasteners to the hopper after they have passed the region of the blade 22, particularly in conjunction with the substantially inclined upper surfaces of angle member 38.

Unoriented fasteners which may be resting on or against the inclined upper surface of angle member 38 as they approach the end of the hopper itself encounter a contoured cam block or deflector 45 which is fixed to angle member 38 as shown in FIGS. 1 and 2, which block deflects such fasteners so that they either orient themselves in the trackway or fall back to the hopper along the steep inclination 42, or are brushed back to fall to the hopper as will presently appear. Without the deflector 45 headed fasteners particularly will occasionally jam at a point where fasteners are normally oriented or returned to the hopper, at which point the track members narrow and form a slight bottleneck.

The portion of the trackway which extends beyond or below the steeply inclined surface portion 42 is provided with a cover plate 50 which is guided for longitudinal reciprocating movement along the trackway, along a line spaced adjustably above the trackway, as by means of a bracket 51 which may be attached to the side surface of the adjacent portion of bracket 30. Cover plate 50 is adapted to be reciprocated in timed relationship with the reciprocation of blade 22 and to this end a lever 53 is fulcrumed against a portion of bracket 30 as at 54 and the lower end thereof is adapted to be engaged by vertically reciprocating blade 22 upon downward reciprocation of the latter to move the cover member 50 upwardly along the trackway.

An extension coil spring 55 which extends between a lower portion of lever 53 and an adjacent portion of wall 10 provides retrograde movement for cover plate 50 upon upward movement of blade 22. Cover plate 50 is primarily provided to maintain orientation of fasteners moving down the trackway by preventing overlapping of their headed portions and other tendencies of the fasteners to become misaligned. The reciprocation of the cover plate facilitates movement of fasteners which might otherwise tend to become jammed against the cover plate and also serves to eject unoriented fasteners which reach this section of the trackway.

In order to facilitate the latter ejecting action the upper end of cover plate 50 is provided with a brush portion 57, preferably a nylon brush with relatively stiff bristles.

Reference will now be had to the mechanism at the lower end of the trackway, heretofore designated generally by the numeral 33, which mechanism dispenses individual fasteners to the driving means either automatically in conjunction with the operation of the driving means or by a manual impulse therefrom or in any other manner. This dispensing means will be referred to as the escapement mechanism and, referring particularly to FIGS. 5 through 8, comprises a block 60 which abuts the lower end face of bracket 30 as at 61 in FIG. 7 and may be screwed thereto as indicated at 62.

The lower end faces of the trackway members, that is the bracket 30 and the angle member 38, are set back slightly from the block-abutting surface 61, as indicated at 63 in FIGS. 6 and 7, to receive a closure plate 64 which depends from a reciprocating fastener dispensing plate 65. The latter is mounted upon the top of block 60 and is guided for reciprocation thereon by a retaining or cover plate 66 which is fixed to the remote end of block 60 as at 67 and the outer end portion of bracket 30 as at 68, whereby plate 66 bridges the dispensing plate 65 and constrains the same for sliding movement on block 60 in a direction at right angles to the direction of extent of the trackway members. The upper surfaces of the lower end portions of the trackway members are recessed as at 70 in FIG. 7 to receive the adjacent edge portion of dispensing plate 65 whereby the latter overlies the terminal portion of the trackway.

Block 60 has a vertically extending recess as at 72 so that fasteners reaching this recess drop through block 60 and a depending Y-fitting 73 to move fasteners into and through a conduit 74 to the driving tool. Closure plate 64 is in a position where it closes off the recess 72 at the trackway side of block 60 during periods when air is connected to fitting 74 to prevent escape of air from the fastener delivering conduit.

Plate 65 is shown in FIGS. 5 and 6 in its two opposite positions. In FIG. 5 plate 65 has been moved to the right by energization of an electromagnet or solenoid 80 against the resistance of an extension coil spring 81 which connects between plate 65 and a bracket 82 which may be fixed to block 60. Solenoid 80 may be fixed to an extension of bracket 82 at the other side of block 60.

Plate 65 is formed with an oblique slot 85 which extends from the upper edge of plate 65, as viewed in FIGS. 5 and 6 to an enlarged opening 86. In FIG. 5 the outer end of slot 85 is in alignment with the trackway between the bracket 30 and angle member 38 and overlies the outer terminal portion of such trackway. Accordingly, a fastener may move along the trackway into the entrance portion of the oblique slot 85 as indicated at 88 in FIGS. 5 and 8, but is arrested at such position by the intersecting relationship between the oblique slot 85 and the trackway, which latter extends vertically as viewed in FIG. 5.

Upon de-energization of electromagnet 80 spring 81 moves plate 65 to the left of the position shown in FIG. 5, whereupon the fastener indicated at 88 in FIG. 5 moves outwardly along the trackway and beyond the same until the enlarged recess 86 of plate 65 and the recess 72 of block 60 are in registry as shown in FIG. 6, whereupon the fastener is free to fall into conduit 74.

It will be noted that an angular plate or block 91 is secured to the upper surface of plate 65 so that, when the shank of a fastener moves into enlarged recess 86 of plate 65, the head thereof will not overlap the edge of the enlarged recess which forms the inner end of slot 85. From the foregoing it will be clear that as soon as the plate 65 reaches the left-hand position illustrated in FIG. 6, the fastener will drop through recess 72 and Y-fitting 73 as mentioned heretofore. In this position of the parts closure plate 64 seals recess 72 from the trackway and blowing air may be introduced to Y-fitting 73 as at 92 to chase the fastener to the driving tool.

We claim:
1. An escapement mechanism for dispensing headed elements comprising a pair of track members wherein the elements are aligned with their heads riding on the track members and their shank portions depending therebetween, a terminal portion at the ends of said track members having a downward recess of a size to pass the fasteners therethrough including their head portions, said recess forming a terminal enlargement of the space between the track members, a transverse groove in the upper surface of said terminal portion encompassing said recess and an adjacent portion of the space between said track members, a plate mounted in said recess for transverse sliding movement with its upper surface flush with the upper surface of said track members to form a continuation thereof, a recess in said plate adapted to register with the recess in said terminal portion when the plate is in one of its end positions, said plate recess being likewise of a size to pass the fasteners including their head portions, and an oblique slot in said plate extending from the edge thereof adjacent to said track members to the recess therein, the portion of said slot at the edge of said plate being in registry with the space between said track members at the other end position of said plate, and means for reciprocating said plate from said other end position to said one end position to move fasteners along said track members to said terminal portion recess as said oblique slot traverses the space between the track members from said plate edge portion to said terminal portion recess.

2. Apparatus as in claim 1 wherein said plate carries a wall member movable transversely therewith and adapted to be disposed between said downward recess and the space between said track members when said plate is in said other position and to move from between said recess and said space when said plate moves to said one position.

References Cited in the file of this patent
UNITED STATES PATENTS

| | | |
|---|---|---|
| 326,246 | Richards | Sept. 15, 1885 |
| 495,640 | Sands | Apr. 18, 1893 |
| 504,435 | Jones | Sept. 5, 1893 |
| 561,324 | Kempshall | June 2, 1896 |
| 959,918 | Campbell | May 31, 1910 |
| 1,154,680 | White | Sept. 28, 1915 |
| 1,600,238 | McCain | Sept. 21, 1926 |
| 1,786,469 | Williams | Dec. 30, 1930 |
| 1,839,490 | Moeller | Jan. 5, 1932 |
| 1,845,651 | Dickson | Feb. 16, 1932 |
| 2,192,503 | Newman | Mar. 5, 1940 |
| 2,343,798 | Poupitch | Mar. 7, 1944 |
| 2,385,141 | Kuehlman | Sept. 18, 1945 |
| 2,531,099 | Anderson | Nov. 21, 1950 |
| 2,544,165 | Krasnow | Mar. 6, 1951 |
| 2,752,061 | Michlein | June 26, 1956 |
| 2,754,860 | Moore et al. | July 17, 1956 |